Sept. 27, 1955   R. CLADE   2,718,665
PLASTIC SEALED VALVE
Filed Dec. 29, 1949
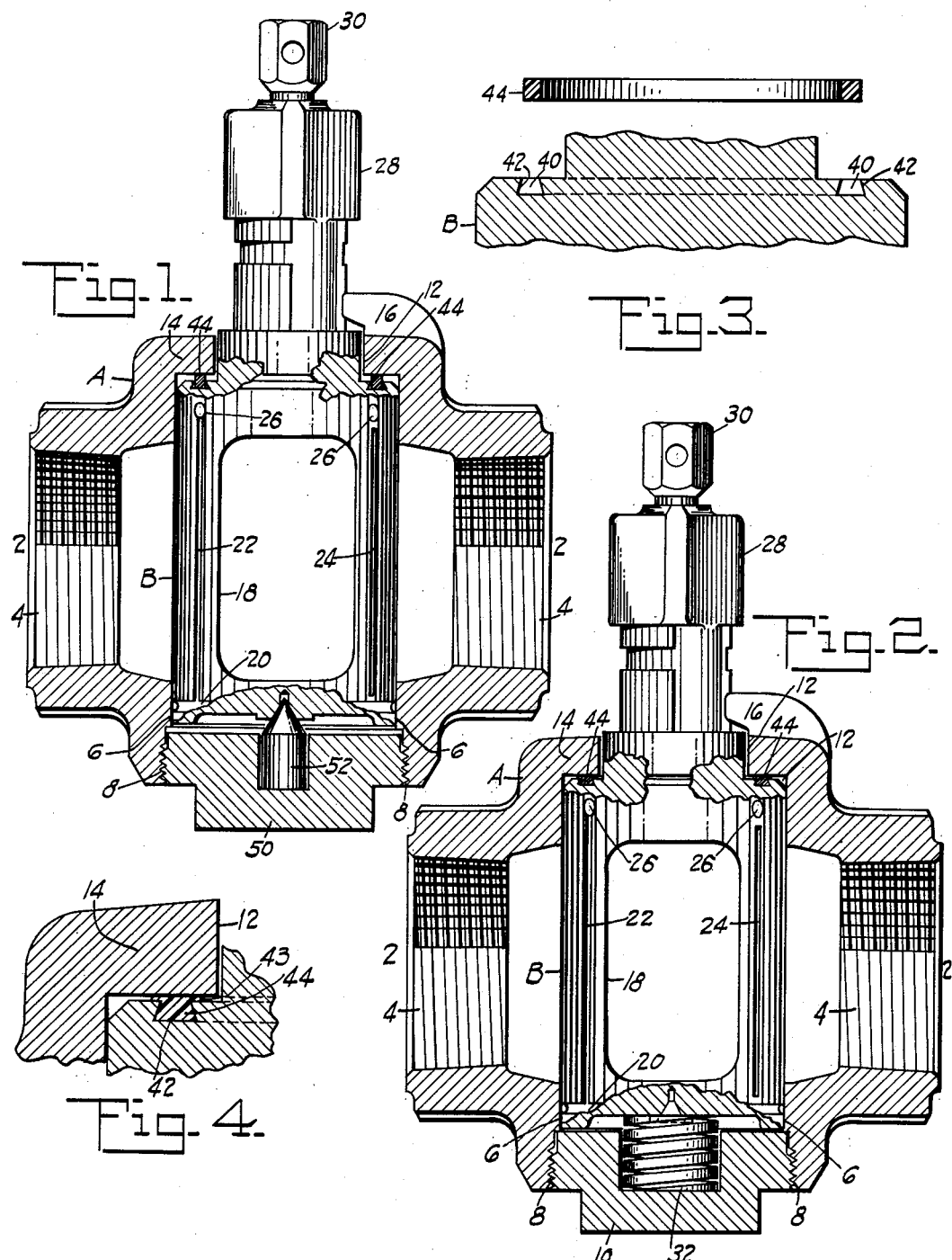
INVENTOR
Robert Clade
BY
Robert A. Shields
ATTORNEY

# United States Patent Office 2,718,665
Patented Sept. 27, 1955

2,718,665

PLASTIC SEALED VALVE

Robert Clade, Detroit, Mich., assignor, by mesne assignments, to W-K-M Manufacturing Company, Inc., a corporation of Delaware Application December 29, 1949, Serial No. 135,734

2 Claims. (Cl. 18—47.5)

This invention relates to valves in general and in particular to lubricated valves having the neck area sealed by a substantially chemically inert plastic gasket.

Lubricated plug valves have in the past been built relying either solely on lubricant for a neck seal or upon a combination of lubricant and a packing which was usually made of resilient metal. The packings heretofore used have been extremely hard to retain in place and have not been sufficiently inert to permit a wide range of ladings. Furthermore, it was almost impossible to make a pressure-tight seal between the plug and body in the neck zone. An object, therefore, of the present invention is the provision of a plastic gasket effectively sealing the neck zone of a valve.

A further object of the invention is the provision of a chemically inert gasket securely locked into position between the moving parts of a valve.

A yet further object of the invention is the provision of a valve plug having a chemically inert gasket locked thereto under pressure applied with the parts in assembled position.

Still another object of the invention is the provision of a valve having a gasket locked to one of the moving parts by means of pressure and movement applied while the valve is in assembled condition.

These and other objects of the invention will be apparent to persons skilled in the art from a study of the following description and accompanying drawings, in which:

Fig. 1 is a sectional view of the improved valve with parts broken away to better disclose the construction and showing the valve in the preliminary assembled position.

Fig. 2 is a sectional view similar to Fig. 1 but showing the valve in its final assembled condition;

Fig. 3 is a fragmentary exploded view showing the parts prior to assembly, and

Fig. 4 is an enlarged fragmentary sectional view showing the sealing material in its final condition.

Referring now to the drawings in detail it will be seen that the valve is made of two parts, namely, the body A and plug B. The body may be of any desired shape but is shown as having passageways 2 formed therein and threaded as at 4 to receive pipe or other means, the flow through which is to be controlled by the valve. Extending transversely of the main passageway is a cylindrical plug receiving bore 6, the lower ends of which are enlarged and threaded as at 8 to receive a base plug 10. The upper end of the plug receiving bore is partially closed by an end wall having a central opening 12 formed therein and with the remaining portions constituting overhanging shoulders 14. A stop 16 is cast or otherwise formed on the body for the purpose of limiting the rotary motion of the plug of a predetermined degree.

The plug B is of generally cylindrical formation having a passageway 18 formed therein for the flow of lading and is provided with a bottom circumferential groove 20, a pair of full length axially extending grooves 22 and a pair of short axially extending grooves 24. Lubricant will be fed to the grooves by means of radial passages 26 receiving their supply of lubricant from the stem 28, with the lubricant being placed under pressure by means of a lubricant screw or other pressure device 30. When the valve is in its final assembled condition the plug will be held in its upward fully raised position by means of a spring 32 seated in the base plug 10 and constantly urging the plug upwardly. The function of this spring and the operation of the lubricant system is fully set forth in my Patent 2,038,887.

An annular circumferential groove 40 is cut in the upper portion of the plug and surrounds the stem as clearly shown in the figures. This annular groove is formed with upwardly tapering sides 42 and having their upper edges spaced apart so as to receive a gasket 44 of rectangular cross section, all as clearly shown in Figs. 1 and 3. This gasket is preferably made of polytetrafluoroethylene and is substantially chemically inert and will withstand comparatively high temperatures without excessive flow and without disintegrating. In order to lock the gasket of polytetrafluoroethylene in the upwardly tapering groove the gasket is placed in the groove as shown in Fig. 1 and a special base plug 50 is screwed into position. This special base plug is provided with a solid center 52 adapted to engage and bear within the center about which the plug was finished. This special base plug will be tightly forced into the body while the valve plug is being rotated. This heavy pressure exerted by the special base plug coupled with the rotation of the valve plug will cause the polytetrafluoroethylene to flow and assume the position shown in Figs. 2 and 4. In this condition the polytetrafluoroethylene has fully filled the upwardly tapering groove 40 and overflowed the upper edges as at 43 to securely lock the gasket in the plug. The gasket will now be of flattened truncated triangular cross-section, or more properly will have a cross-section similar to a tau cross. After the gasket has been formed the special base plug and center is removed and the final base plug and spring inserted to place the valve in the condition shown in Fig. 2. Thus it will be seen that the gasket of polytetrafluoroethylene is securely locked to the plug and perfectly matched to the body shoulders 14 since it is simultaneously formed and locked into position while the valve parts are moving to their final assembled position under pressure and rotation, thus any slight irregularities or ridges in the body shoulder will be formed in the gasket and increase the sealing value thereof. It will be obvious, of course, that the tapered groove may be formed in the body shoulders instead of in the plug, but in any case the manner of forming the final gasket will be the same.

While the invention has been described more or less in detail with specific reference to the accompanying drawings, it will be obvious to persons skilled in the art that various modifications and rearrangements of parts may be made without departing from the scope of the invention as defined by the following claims.

What is claimed is:

1. The method of fastening a gasket on a valve having relatively rotatable overlapping shoulders which comprises forming an annular dovetail groove in one of the shoulders, placing a plastic material of rectangular cross-section having a height greater than the depth of the groove in the dovetail groove, and applying pressure to force the shoulders toward each other while maintaining relative rotary motion to thereby flow the material to fill the groove and overflow the edges thereof and conform to the surface irregularities of the adjacent shoulder.

2. The method of fastening a gasket on a valve having overlapping body and plug shoulders surrounding a projecting stem which comprises, forming an annular groove having upwardly converging sides in the plug shoulder, placing an annulus of polytetrafluoroethylene of rectangular cross-section having a height materially greater than the depth of the groove in said groove, placing the plug in the valve body, and applying pressure on the plug to force the shoulders toward each other while rotating the plug by means of the stem to thereby flow the polytetrafluoroethylene into the groove to fill the same and to overflow the edges of the groove and to conform the upper surface thereof to the surface irregularities of the plug shoulder, said gasket when so formed being of generally tau cross shape in cross-section.

References Cited in the file of this patent

UNITED STATES PATENTS

| | | |
|---|---|---|
| 240,754 | O'Meara | Apr. 26, 1881 |
| 322,242 | Berry | July 14, 1885 |
| 767,600 | Sjoberg | Aug. 16, 1904 |
| 874,652 | Bailey | Dec. 24, 1907 |
| 1,424,094 | Gunn et al. | July 25, 1922 |
| 1,650,077 | Lamb | Nov. 22, 1927 |
| 2,263,454 | Clade | Nov. 18, 1941 |
| 2,350,905 | Koehler | June 6, 1944 |
| 2,394,243 | Joyce | Feb. 5, 1946 |
| 2,456,262 | Fields | Dec. 14, 1948 |

FOREIGN PATENTS

| | | |
|---|---|---|
| 521,655 | Germany | Mar. 25, 1931 |

OTHER REFERENCES

Industrial and Engineering Chemistry, September 1946, vol. 38, No. 9, pages 871 to 877.